United States Patent [19]

Brown

[11] 4,339,663
[45] Jul. 13, 1982

[54] PULSED NEUTRON WELL LOGGING SYSTEM AND METHOD WITH SYNCHRONIZATION/STABILIZATION PULSE VERIFICATION MEANS

[75] Inventor: Winthrop K. Brown, Bellaire, Tex.

[73] Assignee: Texaco Inc., White Plains, N.Y.

[21] Appl. No.: 162,713

[22] Filed: Jun. 25, 1980

[51] Int. Cl.³ .............................................. G01V 5/00
[52] U.S. Cl. ................................................. 250/270
[58] Field of Search ............... 250/261, 262, 263, 270; 340/853, 856, 861

[56] References Cited

U.S. PATENT DOCUMENTS

| | | | |
|---|---|---|---|
| 3,609,366 | 9/1971 | Schwartz | 250/262 |
| 3,925,749 | 12/1975 | McLaughlin et al. | 250/263 X |
| 3,930,154 | 12/1975 | Scott | 250/262 X |
| 4,136,278 | 1/1979 | Oliver | 250/263 X |
| 4,168,428 | 9/1979 | Culver | 250/263 |
| 4,239,965 | 12/1980 | Oliver et al. | 250/262 X |

*Primary Examiner*—David L. Willis
*Attorney, Agent, or Firm*—Carl G. Ries; Robert A. Kulason; Ronald G. Gillespie

[57] ABSTRACT

A well logging system and method involves the use of a well logging tool in a borehole traversing an earth formation which includes a pulsed neutron generator periodically bombarding the earth formation with neutrons. A scintillation-type detector detects gamma radiation from the earth formation and provides electrical data pulses corresponding in pulse height and frequency to the detected gamma radiation. Another circuit provides synchronization/stabilization pulses which are time related to the neutron bombardments of the formation. A cable conducts the data pulses and the synchronization/stabilization pulses uphole to surface electronics. A receiver with surface electronics processes the pulses and provides them to a gate circuit which passes or blocks the data pulses and the synchronization/stabilization pulses in accordance with a gate signal. The passed pulses are provided to a pulse height analyzer. The synchronization/stabilization pulses are also provided by the receiver to a gate signal network which provides the gate signal in accordance with the synchronization/stabilization pulses.

8 Claims, 11 Drawing Figures

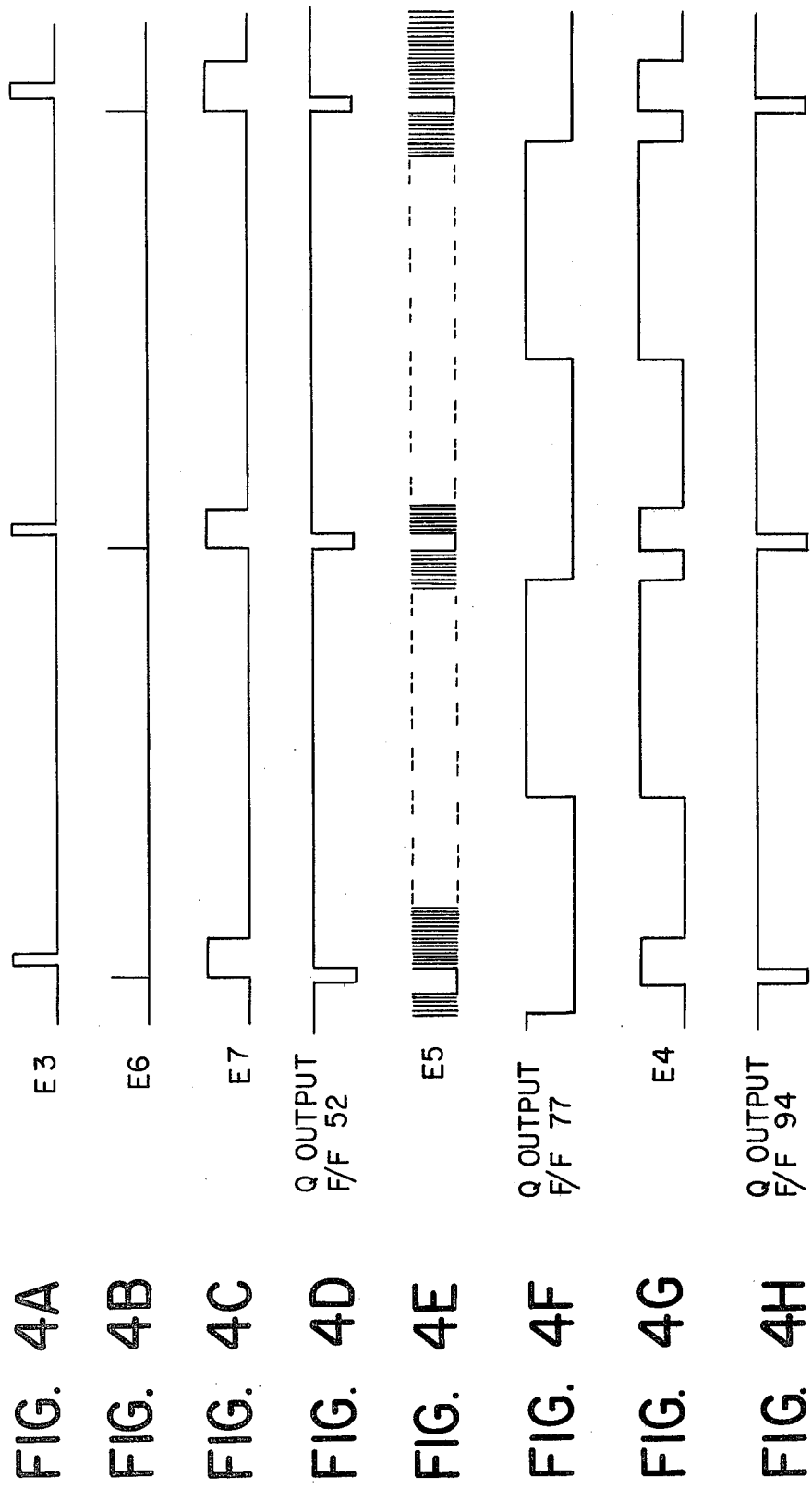

4,339,663

PULSED NEUTRON WELL LOGGING SYSTEM AND METHOD WITH SYNCHRONIZATION/STABILIZATION PULSE VERIFICATION MEANS

BACKGROUND OF THE INVENTION

1. Field of the Invention

The present invention relates to well logging systems and methods and, more particularly, to pulsed neutron well logging systems and methods.

2. Description of the Prior Art

Heretofore in a pulsed neutron logging system where a combination synchronization/stabilization pulse, hereinafter referred to as a sync/stab pulse, is generated before the neutron burst. The sync/stab pulse is used at the surface to trigger a window (gate) which occurs after the neutron burst. The detected gamma rays are only measured and counted during this window.

Two problems are created at the surface. The first problem is that the counts due to the sync/stab pulse will not be displayed in the spectrum since the gate is not open at the time the sync/stab pulse occurs. A second problem is that a single channel analyzer used to detect sync/stab pulses misses a sync pulse, due to "pile-up", noise, etc. It may be triggered by a pulse during the neutron burst. The erroneous triggering causes the time gate to open at the wrong time interval. The resultant shift in timing will give erroneous results and possibly allow some of the next burst through the gate. Since the gate is misplaced in time the next sync pulse may be missed and repeat the process until the synchronization circuit misses a full cycle while collecting data at the wrong times.

The present invention provides for the gate to be open when a sync/stab pulse occurs, thus allowing the recording of the sync/stab pulses. The present invention also closes the gate if the next sync/stab pulse does not occur during the narrow gate period used in the previous application to allow the sync/stab pulse through the gate. Since the narrow gate is generated by the previous sync/stab pulse, the main gate will open only if the present detected sync/stab pulse occurs during the small window. The probability of two noise pulses or pile-up pulses occurring at the right time in succession is very small. The blank or missing gates will have less effect on the accuracy of the data than the gates that are misplaced in time.

SUMMARY OF THE INVENTION

A well logging system and method involves the use of a well logging tool in a borehole traversing an earth formation which includes a pulsed neutron generator periodically bombarding the earth formation with neutrons. A scintillation-type detector detects gamma radiation from the earth formation and provides electrical data pulses corresponding in pulse height and frequency to the detected gamma radiation. Another circuit provides synchronization/stabilization pulses which are time related to the neutron bombardments of the formation. A cable conducts the data pulses and the synchronization/stabilization pulses uphole to surface electronics. A receiver in the surface electronics processes the pulses and provides them to a gate circuit which passes or blocks the data pulses and the synchronization/stabilization pulses in accordance with a gate signal. The passed pulses are provided to a pulse height analyzer. The synchronization/stabilization pulses are also provided by the receiver to a gate signal network which provides the gate signal in accordance with the synchronization/stabilization pulses.

The objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE DRAWINGS

FIG. 4 is a graphical representation of voltages occurring during the operation of the time control circuit.

DESCRIPTION OF THE INVENTION

Figure 1:
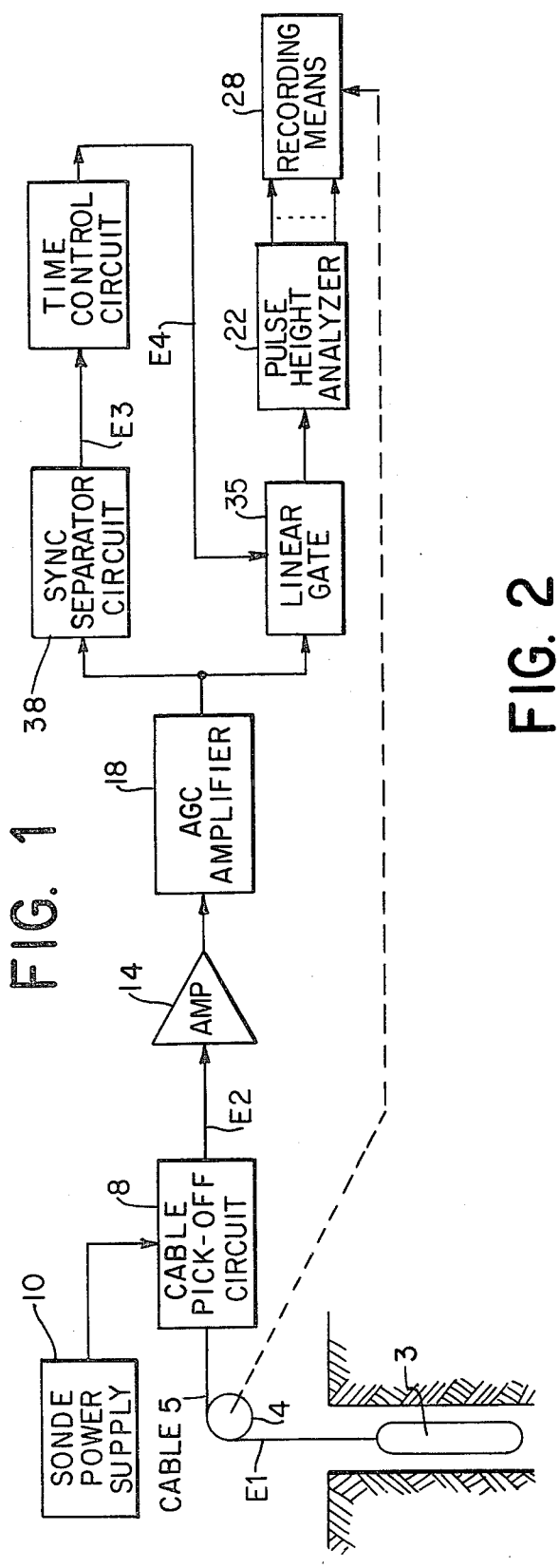
FIG. 1 is a simplified block diagram of a well logging system constructed in accordance with the present invention.
Figure 2:
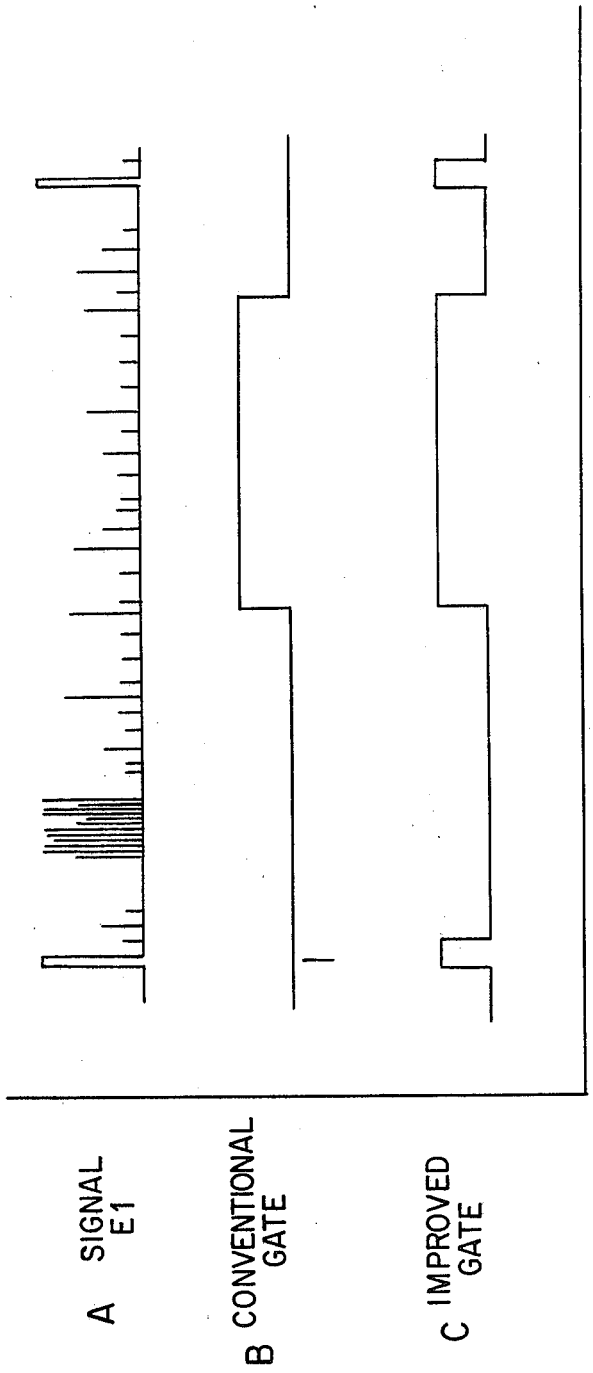
FIG. 2 is a graphical representation of pulses transmitted uphole in relationship to a conventional gate signal and an improved gate signal.

Referring now to FIG. 1 in a conventional neutron well logging system, a downhole well logging sonde 3 includes a neutron generator (not shown) and at least one scintillation-type gamma ray detector (not shown) with associated circuitry which provides a signal E1, shown in FIG. 2A, which include a synchronization/stabilizing pulse and data pulses corresponding to detected gamma rays. A cable 5 electrically connecting well logging sonde 3 to surface electronics passes over a wheel 4 and is connected to a cable pick-off circuit 8. Also a sonde power supply 10 provides the necessary operating voltage, for the electronic in sonde 3, to pick-off circuit 8 for transmission over cable 5 to sonde 3.

Circuit 8 provides signal E2, which is essentially a replica of signal E1, to a conventional amplifier 14. The amplified pulses from amplifier 14 is applied to an automatic gain control (AGC) amplifier 18 whose output in normal conventional well loggers operation would be provided to a pulse height analyzer 22 which in turn breaks down the data pulses by pulse height and provides a corresponding output to recorder means 28. Recorder means 28 drive is correlated with the movement of wheel 4, so that the signals are correlated to depth in the borehole.

The present invention as hereafter explained includes a linear gate 35 receiving the pulses from AGC amplifier 18 and when rendered conductive providing them to the pulse height analyzer 22. The sync separator 38 separates the sync pulses from the data pulses and provides them to a time control circuit, which in turn provides a combined gate output signal E3 to control conductivity of linear gate 35 as hereinafter explained.

Figure 3:
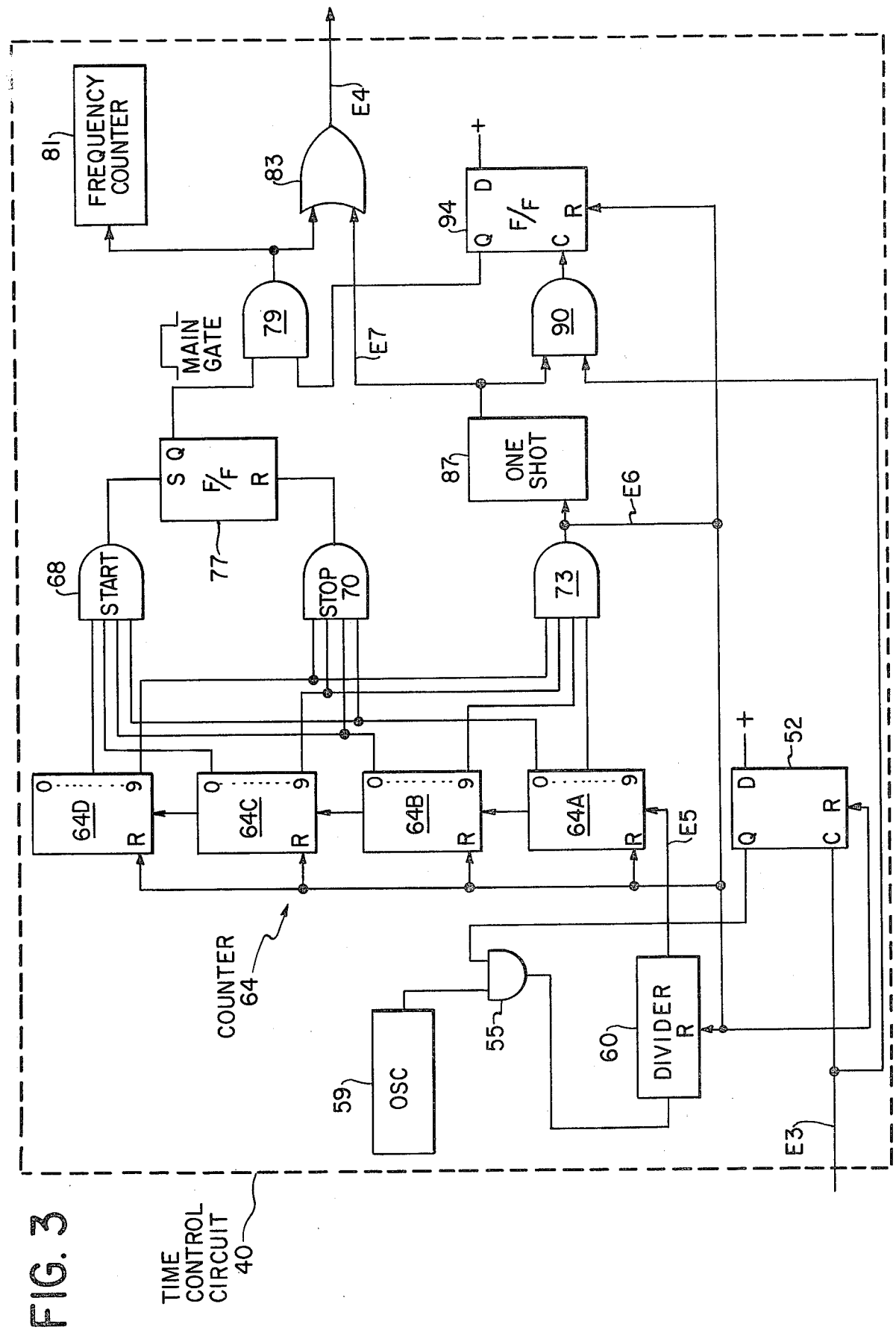
FIG. 3 is a detailed block diagram of the time control circuit shown in FIG. 1.

Referring now to FIG. 3, pulses E3 shown in FIG. 4A trigger a flip-flop 52 in timing control circuit 40 to a set state. A flip-flop provides a high logic level signal at its Q output while in a set state and a low logic level signal at its Q output while in a clear state. The signal appearing at the Q output of flip-flop 52 is shown in FIG. 4D. The high logic level signal from the Q output of flip-flop 52 enables an AND gate 55 to pass timing pulses from an oscillator 59. The passed timing pulses are provided to a divider 60 which provide timing pulses E5 shown in FIG. 4E.

A counter 64 including stages 64A representing counts in microseconds, 64B, representative of counts in 10 microseconds, 64C, representative of counts in 100 microseconds, and 64D, representative of counts in 1000 microseconds. Three AND gates 68, 70 and 73 are connected to counter 64 in a manner so as to decode the count as a function of time. By way of an example, when the count in counter 64 passes through a count corresponding to 4000 microseconds, AND gate 68 provides a pulse to a set input of a flip-flop 77, triggering to a set state. The signal present at a Q output of flip-flop 77 is shown in FIG. 4F. When the count in counter 64 passes through a count corresponding to 9000 microseconds, AND gate 70 provides a pulse to an R input of flip-flop 77 triggering it to a clear state. The signal at the Q output of flip-flop 77 is applied to an AND gate 79 whose output in turn is connected to a frequency counter 81 and to an OR gate 83. OR gate 83 provides signal E4 shown in FIG. 4G.

When counter 64 passes through a count corresponding to 9995 microseconds, AND gate 73 provides a reset pulse E6, shown in FIG. 4B, which triggers a one-shot multivibrator 87 which in turn provides a pulse E7, shown in FIG. 4C, to OR gate 83 and to AND gate 90. AND gate 90 also receives sync/stab pulse E3. When enabled by pulse E7 and sync/stab pulse E3, AND gate 90 provides a pulse to a C input of a flip-flop 94 whose Q output is shown in FIG. 4H. The signal at the Q output of flip-flop 94 is applied to AND gate 79.

The pulse from AND gate 73 is also used to reset divider 60, flip-flops 52 and 94, and counter 64.

In operation, a sync/stab pulse E3 occurs triggering flip-flop 52 to the set state. Pulse E3 is also applied to AND gate 90, which from the previous cycle, assuming it was valid, is receiving pulse E7 so that flip-flop 94 is also triggered to the set state. Counter 64 counts the timing pulses E5 from divider 60. When the count passes through the count corresponding to 4000 microseconds, AND gate 68 provides a pulse output which triggers flip-flop 77 to a set position thereby fully enabling AND gate 79. The output from AND gate 79 goes from a low logic level to a high logic and is registered as a count in frequency counter 81. The high logic level signal from AND gate 79 also causes OR gate 83 to provide signal E4 at a high logic level. As the counting continues, AND gate 70 provides a pulse triggering flip-flop 77 to a low logic level thereby disabling AND gate 79 so that signal E4 returns to a low logic level at about 9000 microseconds. Counter 64 continues to count and at 9995 microseconds AND gate 73 provides reset pulse E6 which triggers one-shot 87 to provide pulse E7 thereby causing OR gate 83 to provide a high logic level signal E4 for the duration of pulse E7. Reset pulse E6 resets may be 52, 94, divider 60 and counter 64. The operation may be repeated upon the occurrence of the next sync pulse.

If by way of accident, an erroneous pulse E3 was received, the timing sequence would be such that it would not occur simultaneously with pulse E7 so that flip-flop 94 would not be triggered to a set state. Therefore, AND gate 79 would be disabled when flip-flop 77 provides a high logic level signal at its Q output. The result would be that signal E4 would not go to a high logic level and would therefore not render linear gate 35 conductive. Further, frequency counter 81 would not count an event. Thus, frequency counter 81 counts the number of successful events to give an indication of the validity of the data.

The present invention, as hereinbefore described, is a well logging system and method having a feature of controlling the accuracy and determining the validity of data obtained on an earth formation.

What is claimed is:

1. A well logging system for investigating an earth formation traversed by a borehole comprising a well logging tool including means for periodically bombarding the earth formation with neutrons, means for detecting gamma radiation from the earth formation and providing data pulses corresponding in pulse height and frequency to the detected gamma radiation, and means for providing sync/stab pulses, time related to the neutron bombardments of the formation; cable means connected to the detecting means and to the sync/stab pulse means for conducting the data pulses and the sync/stab pulses from the well logging tool within the borehole to the surface; and surface means including gate means connected to the cable means for passing or blocking the data pulses and the sync/stab pulses in accordance with a gate signal, pulse height analyzer means connected to the gate means for providing signals corresponding to the characteristics of the earth's formation in accordance with the passed data pulses and the passed sync/stab pulses from the gate means, and means connected to the conducting means and to the gate means for providing the gate signal to the gate means when a valid sync pulse has been provided by the conducting means so as to pass data pulses and sync/stab pulses.

2. A system as described in claim 1 in which the data signal means includes sync separation means connected to the cable means for providing the sync/stab pulses as they are received from the cable means, and time control means connected to the sync separation means for providing the gate signal in accordance with the sync/stab pulses.

3. A system as described in claim 2 in which the time control means includes time signal means for providing timing pulses, first switching means connected to the sync separation means and to the timing signal means for being responsive to a sync/stab pulse to pass the timing pulses and for being responsive to a reset pulse to block the timing pulses, counter means connected to the first switching means for counting the passed timing pulses and providing first and second pulses when a first and second predetermined count, respectively, occurs and for providing a reset pulse when a third predetermined count is reached, said counter means being reset by the reset pulse, data signal means connected to the counter means and responsive to a first pulse for providing a data signal and responsive to a second pulse for terminating the data signal, means connected to the counter means for providing a coincidence pulse in response to a reset pulse, means for providing a "valid" signal in response to a substantially simultaneous occurrence of a coincidence pulse and a sync pulse, and for terminating the valid signal when a reset pulse occurs, second switching means connected to the gate means, to the data signal means, to the coincidence pulse means and to the valid signal means for providing the coincidence pulse as the gate signal and for providing the data signal as the gate signal when a valid signal occurs.

4. A system as described in claim 3, further comprising second counter means connected to the second switching means for counting the occurrences of the second switching means providing the data signal as the gate signal.

5. A system as described in claims 3 or 4 in which the valid signal means includes a first AND gate connected to the sync separation means and to the coincidence pulse means for providing a logic signal at one level when a sync/stab pulse and a coincidence pulse occurs substantially simultaneously and for providing a logic signal at another level when the sync/stab pulse and the coincidence pulse do not occur simultaneously, first flipflop means connected to the first counter means and to the first AND gate for providing a "valid" signal in response to the logic signal from the first AND gate being at the one level and for terminating the "valid" signal in response to a reset pulse.

6. A system as described in claim 5 comprising the second switching means includes a second AND gate connected to the data signal means and to the first flip-flop means for passing the data signal when the first flip-flop means provides a "valid" signal, and the second counter means is connected to the second AND gate and counts each occurrence of the second AND gate passing the data signal.

7. A well logging method for logging a borehole traversing an earth formation, comprising the steps of periodically bombarding the earth formation with neutrons from within the borehole, detecting gamma radiation from the earth formation within the borehole, providing data pulses corresponding in pulse height and frequency to the detected gamma radiation, providing sync/stab pulses within the borehole, time related to the neutron bombardment of the earth formation, conducting the data pulses and the sync/stab pulses from within the borehole to the surface of the earth formation, providing at the surface a gate signal in response to a valid sync/stab pulse being conducted to the surface, passing or blocking the data pulses and the sync/stab pulses in accordance with the gate signal, providing signals corresponding to the characteristics of the earth formation in accordance with the passed data pulses, and providing the data signal in accordance with valid sync/stab pulses.

8. A method as described in claim 7 in which the gate signal step includes the steps of providing timing pulses when a sync/stab pulse has been received at the surface until a reset pulse occurs, counting the timing pulses, providing a gate signal when a first predetermined count has occurred and a valid sync pulse has occurred, terminating the gate signal at a second predetermined count, providing a reset pulse at a third predetermined count, and providing a gate signal of a predetermined duration in response to occurrence of the third predetermined count.

* * * * *